United States Patent
Tkaczyk et al.

(10) Patent No.: US 7,212,604 B2
(45) Date of Patent: May 1, 2007

(54) MULTI-LAYER DIRECT CONVERSION COMPUTED TOMOGRAPHY DETECTOR MODULE

(75) Inventors: John Eric Tkaczyk, Delanson, NY (US); James Walter Leblanc, Niskayuna, NY (US); Wen Li, Clifton Park, NY (US); Deborah Joy Walter, Burnt Hills, NY (US); Yanfeng Du, Rexford, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/171,169

(22) Filed: Jun. 29, 2005

(65) Prior Publication Data

US 2007/0003006 A1    Jan. 4, 2007

(51) Int. Cl.
  *H01L 25/00* (2006.01)
(52) U.S. Cl. ............................................ 378/19; 378/4
(58) Field of Classification Search ........... 250/370.09, 250/370.1, 385.1, 382.1; 378/19, 168, 98.8, 378/4
  See application file for complete search history.

(56) References Cited

U.S. PATENT DOCUMENTS

| | | | |
|---|---|---|---|
| 6,118,125 A * | 9/2000 | Carlson et al. ........ | 250/385.1 |
| 6,928,144 B2 * | 8/2005 | Li et al. ................ | 378/98.8 |
| 2002/0018543 A1 * | 2/2002 | Danielsson ............. | 378/98.8 |
| 2002/0036269 A1 * | 3/2002 | Shahar et al. .......... | 250/370.1 |
| 2003/0010924 A1 * | 1/2003 | El-Hanany et al. .... | 250/370.09 |
| 2003/0169847 A1 | 9/2003 | Karellas et al. ........ | 378/98.3 |
| 2004/0000630 A1 * | 1/2004 | Spartiotis et al. ...... | 250/208.1 |
| 2004/0251420 A1 | 12/2004 | Sun ....................... | 250/370.09 |

* cited by examiner

*Primary Examiner*—Edward J. Glick
*Assistant Examiner*—Hoon Song
(74) *Attorney, Agent, or Firm*—Fletcher Yoder (57) ABSTRACT

A computed tomography detector module is presented. The detector module includes a substrate having a topside and a bottom side. Additionally, the detector module includes a plurality of detector layers disposed on the top side of the substrate in a direction that is substantially orthogonal to the substrate, where each of the plurality of detector layers comprises a direct conversion material configured to absorb radiation, and where each of the plurality of detector layers comprises a first side and a second side. Further, the detector module includes a plurality of pixelated anode contacts is disposed on the first side of each of the plurality of detector layers. Also, the detector module includes a common cathode contact is disposed on the second side of each of the plurality of detector layers.

17 Claims, 9 Drawing Sheets

MULTI-LAYER DIRECT CONVERSION COMPUTED TOMOGRAPHY DETECTOR MODULE

BACKGROUND

The invention relates generally to radiographic detectors for diagnostic imaging, and more particularly to a multi-layer, direct conversion computed tomography (CT) detector for high flux rate imaging with photon counting and energy discrimination.

Radiographic imaging systems, such as x-ray and computed tomography (CT) have been employed for observing, in real time, interior aspects of an object. Typically, the imaging systems include an x-ray source that is configured to emit x-rays toward an object of interest, such as a patient or a piece of luggage. A detecting device, such as an array of radiation detectors, is positioned on the other side of the object and is configured to detect the x-rays transmitted through the object. As will be appreciated, the intensity of the attenuated beam radiation received at the array of detectors is typically dependent upon the attenuation of the x-rays by the object. Each detector element of the array of detectors is configured to produce a separate electrical signal indicative of the attenuated beam received by the respective detector element. The electrical signals are then transmitted to a data processing system for analysis and image production.

Conventional CT imaging systems utilize detectors that convert radiographic energy into current signals that are integrated over a time period, then measured and ultimately digitized. A drawback of such detectors however is their inability to provide data or feedback as to the number and/or energy of photons detected. As will be appreciated by one skilled in the art, typically, conventional CT detectors have a scintillator component and photodiode component. The scintillator component illuminates upon radiation by radiographic energy. Further, the photodiode detects illumination of the scintillator component and provides an electrical signal as a function of the intensity of illumination. These energy discriminating, direct conversion detectors are capable of not only x-ray counting, but also providing a measurement of the energy level of each x-ray detected. Typically, semiconductor materials have been used in the construction of direct conversion energy discriminating detectors, while other materials may also be employed in the construction of these detectors.

However, a drawback of these direct conversion semiconductor detectors is that these types of detectors cannot count at the x-ray photon flux rates typically encountered with conventional CT systems. Further, the very high x-ray photon flux rate has been known to cause pile-up and polarization that ultimately leads to detector saturation. In other words, these detectors typically saturate at relatively low x-ray flux level thresholds. Above these thresholds, the detector response is not predictable or has degraded dose utilization.

Further, as will be appreciated, detector saturation leads to loss of imaging information and consequently results in artifacts in x-ray projection and CT images. In addition, hysteresis and other non-linear effects occur at flux levels near detector saturation as well as flux levels over detector saturation. As previously noted, direct conversion detectors are also susceptible to a phenomenon called "polarization" where charge trapping inside the material changes the local electric field, alters the detector count and energy response in an unpredictable way, and results in hysteresis where response is altered by previous exposure history. In particular, photon counting, direct conversion detectors, saturate due to the intrinsic charge collection time (i.e., dead time) associated with each x-ray photon event. Saturation occurs due to pulse pile-up when the x-ray photon absorption rate for each pixel is on the order of the inverse of this charge collection time. The charge collection time is approximately proportional to the smaller of either the thickness of the direct conversion layer for a fixed electric field or the anode contact size; therefore, an increase in saturation rate is possible if the direct conversion layer is thinner. However, a sufficient thickness is desirable to stop almost all the x-rays and thus, optimize dose utilization. Incomplete collection of x-rays results in reduced image quality, i.e., a noisy image.

In addition, detectors that measure x-ray photon count rate and energy are subject to a count rate saturation limit. This limit is related to the charge collection time for transport across the detector thickness. Thin detectors allow for rapid charge collection, but they do not have sufficient stopping power to capture the x-rays efficiently when the x-rays are incident along the thin dimension. Therefore, in conventional detectors, a single layer with relatively large thickness (e.g., greater than 1 mm) is used to achieve high efficiency. However, this leads to large charge collection time and associated low flux rate saturation limits. Another disadvantage of thick layer detectors is that charge trapping is more likely during transport through a thick layer. Trapped charge changes the internal electric field and consequently alters the detector gain and spectral response. Transport across a thick layer is also associated with charge sharing between pixels. X-rays that are collected near a boundary between two pixels are shared between these pixels leading to miscounting of the number of incident photons, or incorrect registration of the photon energy. Thick layers are also difficult to create by a deposition technique.

Conventionally, a direct conversion detector is typically made from a single layer. An electric field is applied across the thickness of the layer by applying voltage to contacts on the faces of the layer. The layer is oriented with the x-rays normal to its face. Charge transport occurs across the thickness of the layer. During this charge transport, crosstalk and charge trapping occurs and the incomplete collection of charge causes changes in the detector response. However, if the pixel contact dimension is small relative to the thickness (e.g., less than half the thickness), the charge collection time is less sensitive to the layer thickness and is instead largely a function of the pixel contact size as a result of the "small pixel" effect. However, this small pixel effect does not improve the polarization; charge trapping still is as likely to occur during transport across the thickness of the detector layer. In addition, small pixels are subject to greater charge sharing between pixels.

Previously conceived solutions to enable photon counting at high x-ray flux rates include using sub-mm pixel size to achieve lower count rate per pixel and/or using stacked laminated multiple layer detectors to get lower count rates from each detector layer. However, for photon counting, direct conversion detectors with sub-mm pixel size, Detector Quantum Efficiency (DQE) loss due to charge sharing will be disadvantageously significant. Additionally, if the detector works in the energy discrimination mode to count x-rays from two energy bins for material decomposition, the increased charge sharing due to the sub-mm pixel size causes more spillover counts from the high energy window to the lower energy window, thereby degrading the material decomposition performance. Furthermore, employing the stacked multiple layer detector results in non-uniform x-ray sharing in different detector layers since x-rays attenuate exponentially in the detector and the attenuation coefficient is a strong function of x-ray energy.

In addition, smaller pixels or detector elements have larger perimeter to area ratios disadvantageously resulting in elevated levels of cross talk. The perimeter is a region where charge is shared between two or more pixels. This sharing of charge results in incomplete energy information and/or a miscount of x-ray photons because the readout electronics are not configured to combine simultaneous signals in neighboring pixels. Very high flux rates are possible with thin, photon counting, direct conversion silicon layers with pixel size <0.1 mm, but disadvantageously, these thin layers do not possess sufficient stopping power to stop the x-rays.

Furthermore, motion of electrons and holes contributes to a signal generated by room temperature direct conversion detectors. The relatively low mobility and strong trapping of holes is a cause of degraded detector performance. This degraded detector performance includes non-uniform detector response as function of x-ray absorption depth, polarization and unpredictable and unstable charge collection. Therefore, it is desirable to configure the geometry of the pixelated detector to deemphasize the hole contribution to the detector response by leveraging the small pixel effect. In a pixelated detector, it is desirable to keep the ratio of the pixel contact size to the detector thickness small in order to achieve good small pixel effect. Consequently, in this case the signal from the anode pixel is only proportional to the number of electrons arriving at the anode and independent of the x-ray interaction depth thereby resulting in uniform detector response and enhanced energy resolution. Another advantage of better small pixel effect is the shorter detector dead time due to the fact that the signal current pulse width is determined by the electron drift time across the distance of pixel size instead of detector thickness. However, for the laminated detector configuration with multiple thin layers, the good small pixel effect is no longer achievable using the conventional simple pixelated anode if the pixel contact size is comparable or larger than the detector thickness. Consequently, the detector may experience significant degradation of energy resolution. Additionally, the detector dead time may not be optimized.

It would therefore be desirable to develop a direct conversion, energy discriminating CT detector that does not saturate at the x-ray photon flux rates typically found in conventional CT systems. It would be further desirable to develop a direct conversion, energy discriminating CT detector that advantageously facilitates shorter detector dead time and a substantially uniform and stable detector response, thereby circumventing the limitations of current techniques.

BRIEF DESCRIPTION

Briefly, in accordance with aspects of the present technique, a computed tomography detector module is presented. The detector module includes a substrate having a topside and a bottom side. Additionally, the detector module includes a plurality of detector layers disposed on the top side of the substrate in a direction that is substantially orthogonal to the substrate, where each of the plurality of detector layers comprises a direct conversion material configured to absorb radiation, and where each of the plurality of detector layers comprises a first side and a second side. Further, the detector module includes a plurality of pixelated anode contacts disposed on the first side of each of the plurality of detector layers. Also, the detector module includes a common cathode contact disposed on the second side of each of the plurality of detector layers.

In accordance with another aspect of the present technique a computed tomography detector module is presented. The detector module includes a substrate having a topside and a bottom side. Furthermore, the detector module includes a plurality of detector layers disposed on the top side of the substrate in a direction that is substantially orthogonal to the substrate, where each of the plurality of detector layers comprises a direct conversion material configured to absorb radiation, and where each of the plurality of detector layers comprises a first side and a second side. The detector module also includes a plurality of pixelated anode contacts disposed on the first side of each of the plurality of detector layers, where the plurality of pixelated anode contacts comprises anode contacts of substantially equal size. Additionally, the detector module includes a common cathode contact disposed on the second side of each of the plurality of detector layers. The detector module also includes a non-collecting, control grid structure disposed between each of the plurality of pixelated anode contacts, where the control grid structure is configured to facilitate collection of electrons at the plurality of pixelated anode contacts.

In accordance with further aspects of the present technique a computed tomography detector module is presented. The detector module includes a substrate having a topside and a bottom side. Additionally, the detector module includes a plurality of detector layers disposed on the top side of the substrate and configured to absorb radiation, where each of the plurality of detector layers comprises a direct conversion material, and where each of the plurality of detector layers includes a first side and a second side. The detector module also includes a plurality of pixelated anode contacts disposed on the first side of each of the plurality of detector layers, where the plurality of pixelated anode contacts comprises anode contacts of different sizes, and where the size of the pixelated anode contacts is incrementally increased in the direction of radiation. Furthermore, the detector module includes a common cathode contact disposed on the second side of each of the plurality of detector layers. Also, the detector module includes an electrical interconnect layer disposed between adjacent layers of the plurality of detector layers, where the electrical interconnect layer is configured to couple the plurality of pixelated anode contacts disposed on each of the plurality of detector layers to read out electronics.

In accordance with further aspects of the present technique a computed tomography detector module is presented. The detector module includes a substrate having a topside and a bottom side. The detector module also includes a plurality of detector layers disposed on the top side of the substrate and configured to absorb radiation, where each of the plurality of detector layers is oriented at an angle to the direction of radiation, and where each of the plurality of detector layers comprises a direct conversion material, and where each of the plurality of detector layers includes a first side and a second side. Further, the detector module includes a plurality of pixelated anode contacts disposed on the first side of each of the plurality of detector layers. Additionally, the detector module includes a common cathode contact disposed on the second side of each of the plurality of detector layers. Also, the detector module includes an electrical interconnect layer disposed between adjacent layers of the plurality of detector layers, where the electrical inter- connect layer is configured to couple the plurality of pixelated anode contacts disposed on each of the plurality of detector layers to read out electronics.

In accordance with further aspects of the present technique a computed tomography imaging (CT) system is presented. The system includes a radiation source configured to emit a stream of radiation. Further, the CT imaging system includes a detector assembly configured to detect the stream of radiation and to generate one or more signals responsive to the stream of radiation, where the detector assembly comprises a plurality of detectors, and where each of the plurality of detectors comprises a plurality of detector layers disposed on a top side of a substrate, and where each of the plurality of detector layers comprises a direct conversion material, and where each of the plurality of detector layers includes a first side and a second side, and where each of the plurality of detector layers is configured to absorb radiation. In addition, the CT imaging system includes a system controller configured to rotate the radiation source and the detector assembly and to acquire one or more sets of projection data from the plurality of detectors via a data acquisition system. The CT imaging system also includes a computer system operationally coupled to the radiation source and the detector assembly, where the computer system is configured to receive the one or more sets of projection data.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Conventional CT imaging systems utilize detectors that convert radiographic energy into current signals that are integrated over a time period, then measured and ultimately digitized. A drawback of such detectors however is their inability to provide data or feedback as to the number and/or energy of photons detected. Further, energy discriminating, direct conversion detectors are capable of not only x-ray counting, but also providing a measurement of the energy level of each x-ray detected. However, a drawback of these direct conversion semiconductor detectors is that these types of detectors cannot count at the x-ray photon flux rates typically encountered with conventional CT systems. Further, the very high x-ray photon flux rate has been known to cause pile-up and polarization that ultimately leads to detector saturation. In other words, these detectors typically saturate at relatively low x-ray flux level thresholds. It would therefore be desirable to develop a direct conversion, energy discriminating CT detector that does not saturate at the x-ray photon flux rates typically found in conventional CT systems. It would be further desirable to develop a direct conversion, energy discriminating CT detector that advantageously facilitates shorter detector dead time and a substantially uniform and stable detector response, thereby circumventing the limitations of current techniques.

Figure 1:
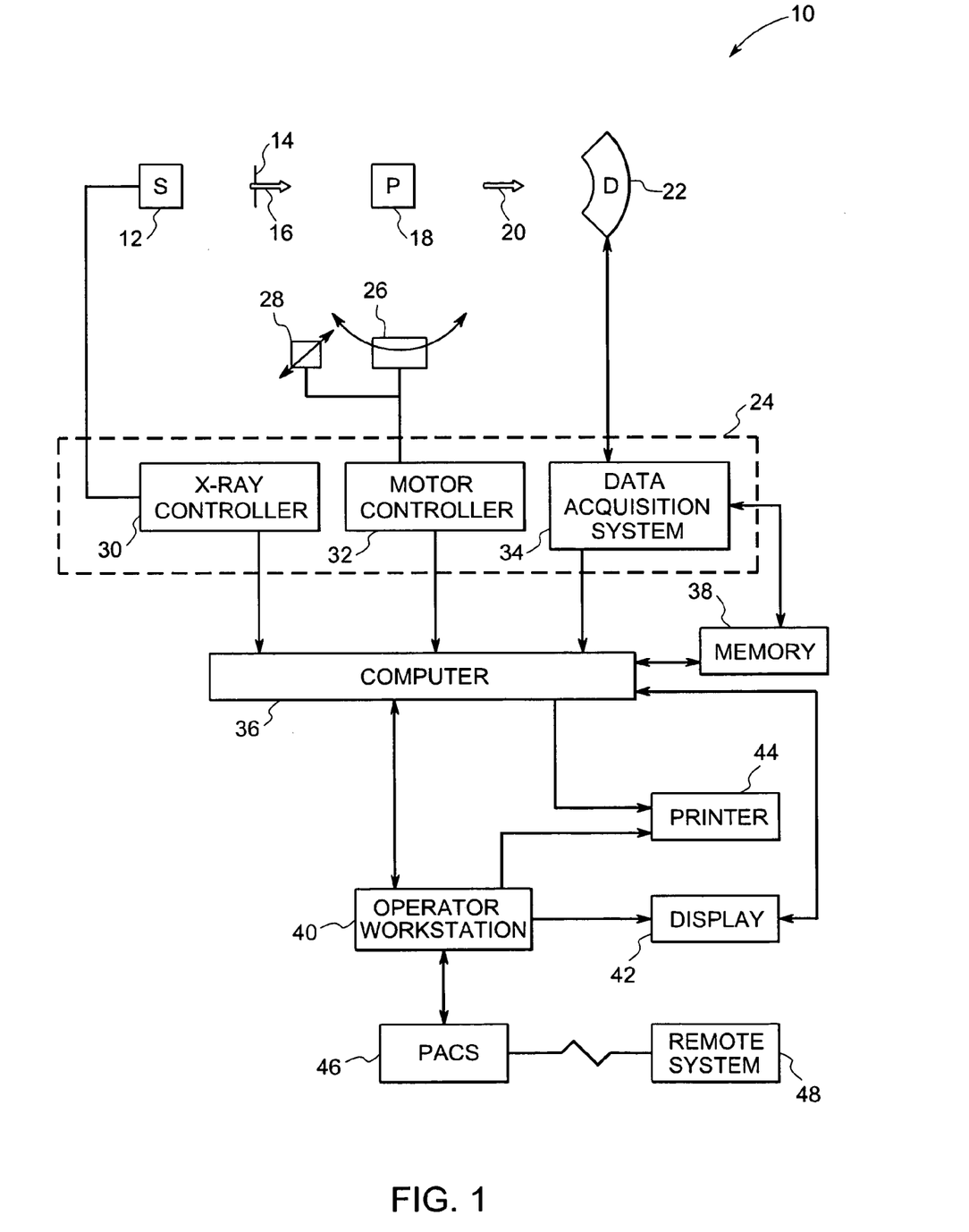
FIG. 1 is a block diagram of an exemplary imaging system in the form of a CT imaging system for use in producing processed images, in accordance with aspects of the present technique.

FIG. 1 is a block diagram showing an imaging system 10 for acquiring and processing image data in accordance with the present technique. In the illustrated embodiment, the system 10 is a computed tomography (CT) system designed to acquire X-ray projection data, to reconstruct the projection data into an image, and to process the image data for display and analysis in accordance with the present technique. In the embodiment illustrated in FIG. 1, the imaging system 10 includes a source of X-ray radiation 12. In one exemplary embodiment, the source of X-ray radiation 12 is an X-ray tube. The source of X-ray radiation 12 may include thermionic or solid-state electron emitters directed at an anode to generate X-rays or, indeed, any other emitter capable of generating X-rays having a spectrum and energy useful for imaging a desired object. Examples of suitable electron emitters include tungsten filament, tungsten plate, field emitter, thermal field emitter, dispenser cathode, thermionic cathode, photo-emitter, and ferroelectric cathode.

The source of radiation 12 may be positioned near a collimator 14, which may be configured to shape a stream of radiation 16 that is emitted by the source of radiation 12. The stream of radiation 16 passes into the imaging volume containing the subject to be imaged, such as a human patient 18. The stream of radiation 16 may be generally fan-shaped or cone-shaped, depending on the configuration of the detector array, discussed below, as well as the desired method of data acquisition. A portion 20 of radiation passes through or around the subject and impacts a detector array, represented generally at reference numeral 22. Detector elements of the array produce electrical signals that represent the intensity of the incident X-ray beam. These signals are acquired and processed to reconstruct an image of the features within the subject.

The radiation source 12 is controlled by a system controller 24, which furnishes both power, and control signals for CT examination sequences. Moreover, the detector 22 is coupled to the system controller 24, which commands acquisition of the signals generated in the detector 22. The system controller 24 may also execute various signal processing and filtration functions, such as for initial adjustment of dynamic ranges, interleaving of digital image data, and so forth. In general, system controller 24 commands operation of the imaging system to execute examination protocols and to process acquired data. In the present context, system controller 24 also includes signal processing circuitry, typically based upon a general purpose or application-specific digital computer, associated memory circuitry for storing programs and routines executed by the computer, as well as configuration parameters and image data, interface circuits, and so forth.

In the embodiment illustrated in FIG. 1, the system controller 24 is coupled via a motor controller 32 to a rotational subsystem 26 and a linear positioning subsystem 28. In one embodiment, the rotational subsystem 26 enables the X-ray source 12, the collimator 14 and the detector 22 to be rotated one or multiple turns around the patient 18. In other embodiments, the rotational subsystem 26 may rotate only one of the source 12 or the detector 22 or may differentially activate various stationary electron emitters to generate X-ray radiation and/or detector elements arranged in a ring about the imaging volume. In embodiments in which the source 12 and/or detector 22 are rotated, the rotational subsystem 26 may include a gantry. Thus, the system controller 24 may be utilized to operate the gantry. The linear positioning subsystem 28 enables the patient 18, or more specifically a patient table, to be displaced linearly. Thus, the patient table may be linearly moved within the gantry to generate images of particular areas of the patient 18.

Additionally, as will be appreciated by those skilled in the art, the source of radiation 12 may be controlled by an X-ray controller 30 disposed within the system controller 24. Particularly, the X-ray controller 30 is configured to provide power and timing signals to the X-ray source 12.

Further, the system controller 24 is also illustrated comprising a data acquisition system 34. In this exemplary embodiment, the detector 22 is coupled to the system controller 24, and more particularly to the data acquisition system 34. The data acquisition system 34 receives data collected by readout electronics of the detector 22. The data acquisition system 34 typically receives sampled analog signals from the detector 22 and converts the data to digital signals for subsequent processing by a computer 36.

The computer 36 typically is coupled to or incorporates the system controller 24. The data collected by the data acquisition system 34 may be transmitted to the computer 36 for subsequent processing and reconstruction. The computer 36 may comprise or communicate with a memory 38 that can store data processed by the computer 36 or data to be processed by the computer 36. It should be understood that any type of memory configured to store a large amount of data might be utilized by such an exemplary system 10. Moreover, the memory 38 may be located at the acquisition system or may include remote components, such as network accessible memory media, for storing data, processing parameters, and/or routines for implementing the techniques described below.

The computer 36 may also be adapted to control features such as scanning operations and data acquisition that may be enabled by the system controller 24. Furthermore, the computer 36 may be configured to receive commands and scanning parameters from an operator via an operator workstation 40, which is typically equipped with a keyboard and other input devices (not shown). An operator may thereby control the system 10 via the input devices. Thus, the operator may observe the reconstructed image and other data relevant to the system from computer 36, initiate imaging, and so forth.

A display 42 coupled to the operator workstation 40 may be utilized to observe the reconstructed images. Additionally, the scanned image may also be printed by a printer 44, which may be coupled to the operator workstation 40. The display 42 and printer 44 may also be connected to the computer 36, either directly or via the operator workstation 40. The operator workstation 40 may also be coupled to a picture archiving and communications system (PACS) 46. It should be noted that PACS 46 might be coupled to a remote system 48, such as radiology department information system (RIS), hospital information system (HIS) or to an internal or external network, so that others at different locations may gain access to the image data.

It should be further noted that the computer 36 and operator workstation 40 may be coupled to other output devices, which may include standard or special purpose computer monitors and associated processing circuitry. One or more operator workstations 40 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, a virtual private network or the like.

Figure 2:
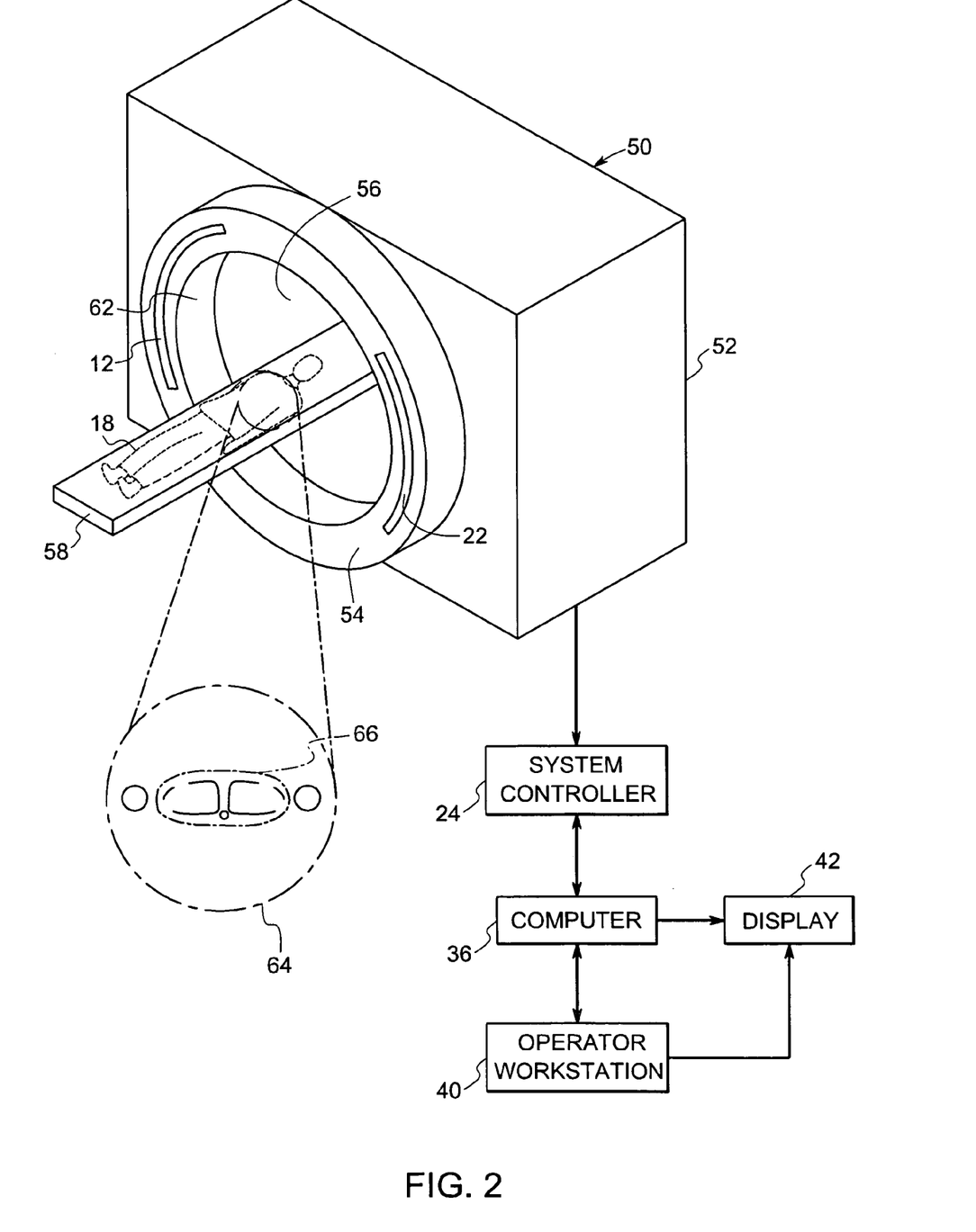
FIG. 2 is a block diagram of a physical implementation of the CT system of FIG. 1.

As noted above, an exemplary imaging system utilized in a present embodiment may be a CT scanning system 50, as depicted in greater detail in FIG. 2. The CT scanning system 50 may be a multi-slice CT (MSCT) system that offers a wide array of axial coverage, high rotational speed of the gantry, and high spatial resolution. Alternately, the CT scanning system 50 may be a volumetric CT (VCT) system utilizing a cone-beam geometry and an area detector to allow the imaging of a volume, such as an entire internal organ of a subject, at high or low gantry rotational speeds. The CT scanning system 50 is illustrated with a frame 52 and a gantry 54 that has an aperture 56 through which a patient 18 may be moved. A patient table 58 may be positioned in the aperture 56 of the frame 52 and the gantry 54 to facilitate movement of the patient 18, typically via linear displacement of the table 58 by the linear positioning subsystem 28 (see FIG. 1). The gantry 54 is illustrated with the source of radiation 12, such as an X-ray tube that emits X-ray radiation from a focal point 62. For cardiac imaging, the stream of radiation is directed towards a cross section of the patient 18 including the heart.

In typical operation, the X-ray source 12 projects an X-ray beam from the focal point 62 and toward detector array 22. The collimator 14 (see FIG. 1), such as lead or tungsten shutters, typically defines the size and shape of the X-ray beam that emerges from the X-ray source 12. The detector 22 is generally formed by a plurality of detector elements, which detect the X-rays that pass through and around a subject of interest, such as the heart or chest. Each detector element produces an electrical signal that represents the intensity of the X-ray beam at the position of the element during the time the beam strikes the detector. The gantry 54 is rotated around the subject of interest so that a plurality of radiographic views may be collected by the computer 36.

Thus, as the X-ray source 12 and the detector 22 rotate, the detector 22 collects data related to the attenuated X-ray beams. Data collected from the detector 22 then undergoes pre-processing and calibration to condition the data to represent the line integrals of the attenuation coefficients of the scanned objects. The processed data, commonly called projections, may then be filtered and backprojected to formulate an image of the scanned area. A formulated image may incorporate, in certain modes, projection data for less or more than 360 degrees of rotation of the gantry 54.

Once reconstructed, the image produced by the system of FIGS. 1 and 2 reveals internal features 66 of the patient 18. In traditional approaches for the diagnosis of disease states, and more generally of medical conditions or events, a radiologist or physician would consider the reconstructed image 64 to discern characteristic features of interest. In cardiac imaging, such features 66 include coronary arteries or stenotic lesions of interest, and other features, which would be discernable in the image, based upon the skill and knowledge of the individual practitioner. Other analyses may be based upon capabilities of various CAD algorithms.

Reconstruction of images 64 of dynamically moving tissue may present particular concerns. Projection data sets that encompass data points acquired at different phases of the cardiac cycle may result in discontinuities or motion-related artifacts in a reconstructed image or a rendered volume comprising a sequence of adjacent images. Therefore, in the context of cardiac imaging, it is generally desirable to acquire or select projection data from a common cardiac phase, such as during a phase in which motion is minimized, that is during the diastolic phase.

Figure 3:
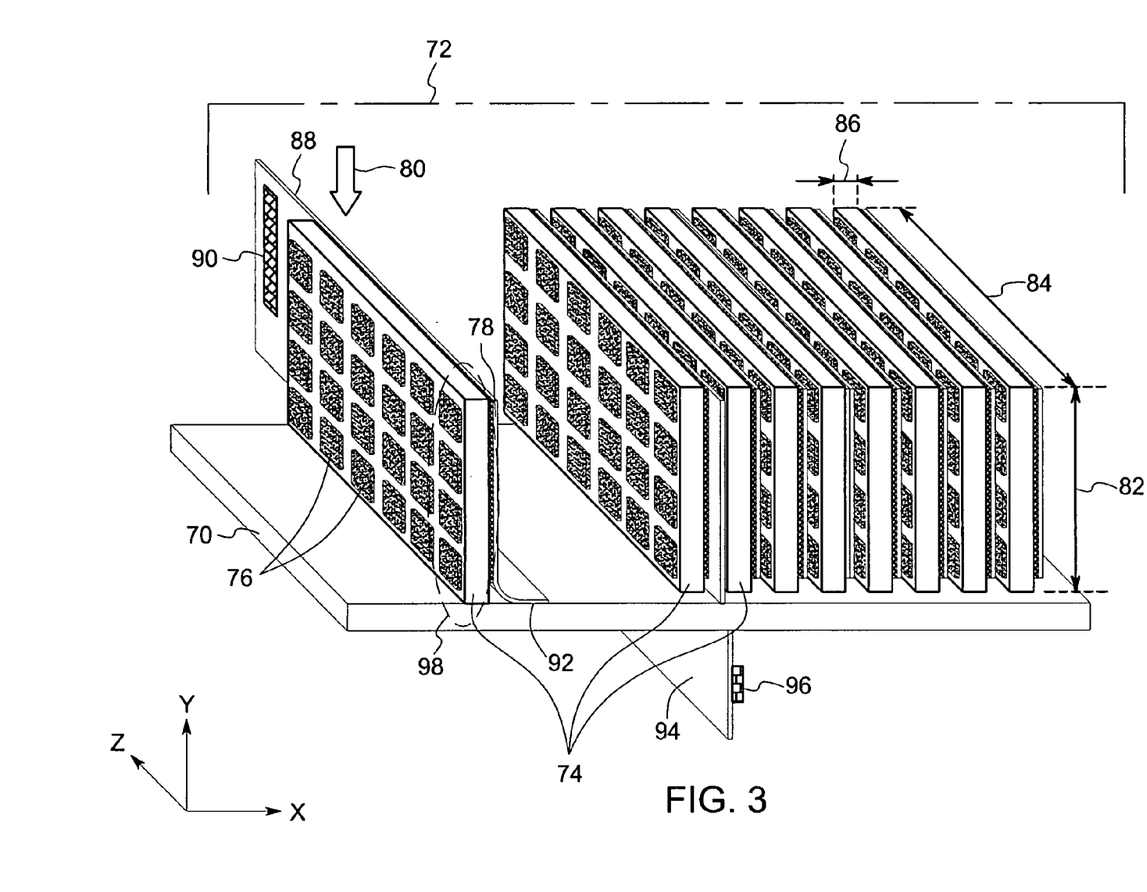
FIG. 3 is a perspective view of an exemplary multi-layer, direct conversion CT detector, in accordance with aspects of the present technique.

FIG. 3 illustrates a perspective view of an exemplary embodiment of a multi-layer, direct conversion CT detector module 68. This CT detector module 68 may be employed for high flux rate x-ray imaging with photon counting and energy discrimination. As will be appreciated by one skilled in the art, the figures are for illustrative purposes and are not drawn to scale. The exemplary CT detector module 68 may be formed by laminating a plurality of slices of direct conversion material with intervening electrical interconnect layers, as will be described hereinafter.

In a presently contemplated configuration, the CT detector module 68 is illustrated as including a substrate 70 having a topside and a bottom side. In one embodiment, the substrate 70 may include an electromechanical substrate, such as a printed circuit board (PCB). However, as will be appreciated, the substrate 70 may also include other materials, such as, but not limited to, glass, silicon or plastic or multi-layer ceramic.

In the illustrated embodiment, the CT detector module 68 is shown as having a plurality of detector layers 72 disposed on the substrate 70. Each of the plurality of detector layers 72 has a respective first side and second side. Further, the plurality of detector layers 72 may be disposed on the topside of the substrate 70 in a direction substantially orthogonal to the substrate 70. The plurality of detector layers 72 may be disposed on the substrate 70 at an angle ranging from about zero degrees to about five degrees. In one embodiment, the plurality of detector layers 72 may be disposed in a direction perpendicular to the substrate 70 (e.g., zero degree angle). Additionally, each of the plurality of detector layers 72 may include a direct conversion material. As will be appreciated, the direct conversion material may be configured to absorb radiation. Also, slices of the direct conversion material may be cut from a crystal or a ceramic block. Alternatively, the slices of direct conversion material may be deposited or screen printed onto an interconnect layer. Also, reference numeral 74 represents individual detector layers within the plurality of detector layers 72.

As previously noted, each of the plurality of detector layers 72 includes a first side and a second side. In a presently contemplated configuration, a plurality of pixelated anode contacts 76 may be disposed on each of the first sides of the plurality of detector layers 72. In one embodiment, the plurality of pixelated anode contacts 76 may be arranged in a two-dimensional array. Further, in a presently contemplated configuration, each of the plurality of pixelated anode contacts 76 is substantially same size. Also, each of the plurality of pixelated anode contacts 76 may be formed using a deposited layer of gold, platinum or other combination of metals. In addition, a continuous, common cathode contact 78 may be disposed on each of the second sides of the plurality of detector layers 72. In the illustrated embodiment, each of the plurality of detector layers 72 may be arranged on the substrate 70 such that each of the plurality of detector layers 72 is oriented perpendicular to the direction of substrate 70 and along a direction of radiation 80. The common cathode contact 78 may be formed employing a deposited layer of gold, platinum or other combination of metals. In this embodiment, the direction of charge transport and direction of radiation are orthogonal. Using this arrangement of the plurality of detector layers 72 on the substrate 70, the detection of high flux rate x-rays may be shared between the plurality of detector layers 72 thereby advantageously circumventing any flux rate saturation of the detector layers 72. Further, the x-ray photons travel in the direction 80 substantially perpendicular to the substrate. X-rays are preferentially absorbed at the region where the x-rays impinge on the detector layers 72. Alternatively, in one embodiment, each of the plurality of detector layers 72 may be arranged on the substrate 70 such that each of the plurality of detector layers 72 is oriented perpendicular to the direction of radiation 80.

In accordance with exemplary aspects of the present technique, the CT detector module 68 may also include a non-collecting, control grid structure disposed between each of the plurality of pixelated anode contacts 76, as will be described in greater detail with reference to FIG. 7.

With continuing reference to the plurality of detector layers 72, in one embodiment, the height 82 of each of the plurality of detector layers 72 may be in a range from about 1 mm to about 5 mm. Also, the length 84 of the plurality of detector layers 72 may be in a range from about 4 mm to about 32 mm. Furthermore, each of the plurality of detector layers 72 may be configured to be substantially thin. For example, the thickness 86 of each of the plurality layers 72 may be in a range from about 0.2 mm to about 2 mm.

According to aspects of the present technique, the CT detector module 68 may also include an electrical interconnect layer disposed between each of adjacent layers of the plurality of detector layers 72. As will be appreciated, the electrical interconnect layer may be configured to electrically couple the plurality of pixelated anode contacts 76 and common cathode contact 78 disposed on each of the plurality of detector layers 72 to read out electronics, such as application specific integrated circuits (ASICs). The electrical interconnect layer may include a flexible circuit. Additionally, the flexible circuit may include copper (Cu) traces formed on a polyimide film. Alternatively, the interconnection to the array of pixelated anode contacts 76 may be accommodated via metal traces (not shown) disposed directly on the plurality of detector layers 72. These metal traces may be configured to run between the anode contacts 76 to the perimeter of the detector layer 72 where they may be electrically coupled to a PCB or the substrate 70 via wire bonds. It may be noted that in this embodiment it may be desirable to dispose an insulating lamination material between each of the plurality of detector layers 72 to prevent electrical shorts between adjacent detector layers 72.

Figure 4:
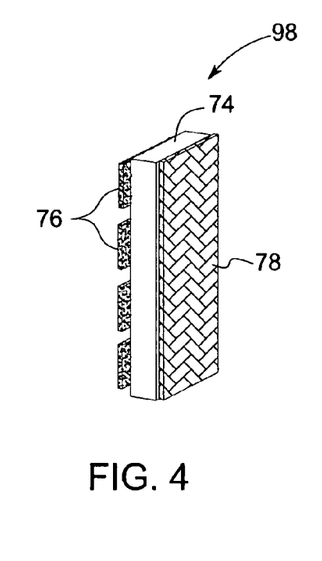
FIG. 4 is an enlarged view of one column of an exemplary layer of the CT detector of FIG. 3, in accordance with aspects of the present technique.

In one embodiment, the CT detector module 68 may include an electrical interconnect layer 88 that extends in the Z-direction and is disposed between each of adjacent layers of the plurality of detector layers 72. This interconnect layer 88 may include a connector 90 that may be configured to facilitate coupling the plurality of pixelated anode contacts 76 and common cathode contact 78 to readout electronics via the electrical interconnect layer 88. The CT detector module 68 may also include an electrical interconnect layer 92 that makes a J-shaped contact with the substrate 70 disposed between each of adjacent layers of the plurality of detector layers 72. In addition, the CT detector module 68 may include an electrical interconnect layer 94 that extends in the negative Y-direction and is disposed between each of adjacent layers of the plurality of detector layers 72. The extension of the electrical interconnect layer 94 through the substrate 70 may be accommodated by slots or slits in the substrate 70. Further, this interconnect layer 94 may include a connector 96 that may be configured to facilitate coupling the plurality of pixelated anode contacts 76 and common cathode contact 78 to readout electronics via the electrical interconnect layer 94. Reference numeral 98 represents one column on one of the detector layers 72. FIG. 4 illustrates an enlarged view of one column 98 of an exemplary layer 72 of the CT detector module 68 of FIG. 3.

Figure 5:
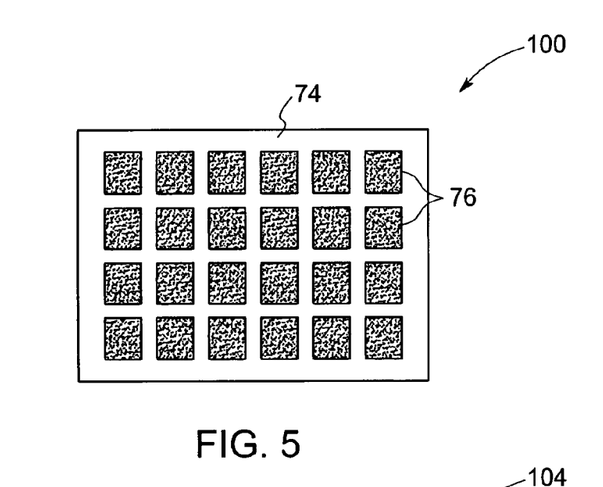
FIG. 5 is a front view of an exemplary arrangement of anode contacts on a layer of the CT detector of FIG. 3, in accordance with aspects of the present technique.
Figure 6:
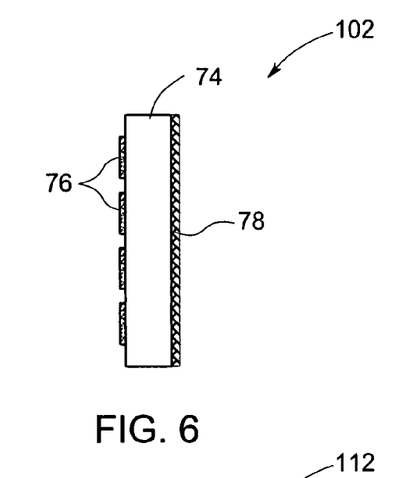
FIG. 6 is a side view of the detector layer of FIG. 5, in accordance with aspects of the present technique.

Turning now to FIG. 5, a front view 100 of an exemplary arrangement of the plurality of pixelated anode contacts 76 on the individual detector layer 74 of FIG. 3 is illustrated. FIG. 6 illustrates a side view 102 of the detector layer 74 of FIG. 5.

Figure 7:
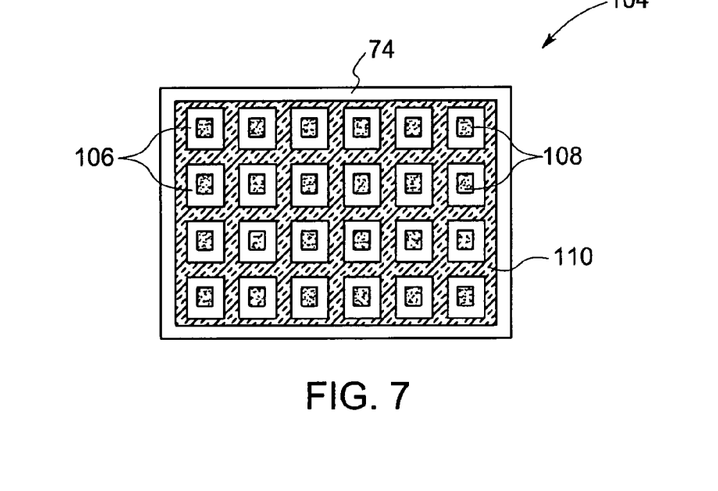
FIG. 7 is a front view of another exemplary arrangement of anode contacts on a layer of the CT detector of FIG. 3, in accordance with aspects of the present technique.

FIG. 7 illustrates a front view 104 of another exemplary arrangement of pixelated anode contacts 76 on the individual detector layer 74 of FIG. 3. As previously noted, the detector layer 74 may include the direct conversion material that is configured to absorb the impinging radiation. Reference numeral 106 represents a plurality of pixel regions, in accordance with aspects of the present technique. In addition, reference numeral 108 represents a plurality of pixelated anode contacts. In this embodiment, the pixel pitch of the pixel regions 106 is substantially similar to the pixel pitch of the pixelated anode contacts 76 (see FIG. 5). Also, the width of the pixelated anode contacts 108 is substantially less than that the pitch of the pixel regions 106. For example, the pixel pitch of the pixel region 106 may be in a range from approximately 0.5 mm to about 3 mm while the width of the pixelated anode contacts 108 may be in a range from about 0.2 mm to about 1 mm. In other words, the size of the pixelated anode contacts 108 is substantially smaller than that of the anode pixelated contacts 76 illustrated in FIG. 5. Consequently, the size of the pixelated anode contacts 108 is small enough to achieve good small pixel effect while maintaining large pixel pitch that is comparable or larger than the detector thickness 86 (see FIG. 3).

As will be appreciated, the motion of electrons and holes contributes substantially to the signal generated in room temperature direct conversion detectors, such as the CT detector module 68. Further, it is desirable to keep the ratio of the pixel contact size to the thickness 86 of detector layers 74 small to ensure good pixel effect which deemphasizes the hole contribution which is subject to severe trapping and poor charge collection. Also, the signal from the anode pixel is proportional to the number of electrons arriving at the anode and independent of the x-ray interaction depth so uniform detector response and good energy resolution may be achieved. Better small pixel effect advantageously results in shorter detector dead time since the signal current pulse width is determined by the electron drift time across the distance of pixel contact size instead of detector thickness.

As previously noted, in accordance with exemplary aspects of the present technique, a non-collecting control grid structure 110 is disposed between each of the plurality of anode pixel regions 106 on each of the plurality of detector layers 74 (see FIG. 3), where the control grid structure 110 is configured to facilitate collection of electrons at the plurality of pixelated anode contacts 108. In accordance with aspects of the present technique, the grid electrode 110 may be configured to surround each of the plurality of anode pixel regions 106 disposed on each layer 74 of the multi-layer, direct conversion detector module 68 to make the size of each pixelated anode contact 108 small enough for good small pixel effect while maintaining large pixel pitch that is comparable or larger than detector thickness 86. The facilitation of charge collection by the grid is particularly useful for configurations where the anode contact size is substantially smaller than the pixel pitch and where the combination of grid and small anode contact size is used to insure a small pixel effect.

Figure 8:
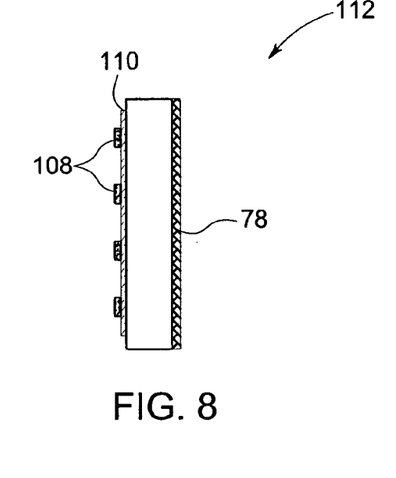
FIG. 8 is a side view of the detector layer of FIG. 7, in accordance with aspects of the present technique.

The grid electrode 110 may be negatively biased relative to the pixelated anode contacts 108 to prevent the collection of electrons at the grid 110. Consequently, the biased grid 110 helps to focus the electric field and facilitates collection of electrons at the pixelated anode contacts 108 thereby resulting in enhanced charge collection. As a result, the width of the pixelated anode contact 108 may be smaller than the pitch of the pixel region 106, which may advantageously result in enhanced spectral response fidelity. In other words, the output charge of the pixel is a better representation of the input x-ray photon energy. To maximize this beneficial effect, it may be desirable to have the grid occupy only a small fraction of the area on the anode side of the detector layer 74 and to have a small area pixelated anode contact 108. There is also the possibility of nesting several grid rings built using multilayer lithography each biased incrementally in order to optimize electric field focusing and insure charge is efficiently collected at the anode contact. In other words, in the exemplary configuration 104 of FIG. 7, the anode pixel regions 106 are configured to have a pixelated anode contact 108. In one embodiment, the pixelated anode contact 108 may be disposed in the center of the anode pixel region 106. Consequently, the pixel pitch remains the same as in FIG. 5. Further, the grid structure 110 is biased differently from that of the pixelated anode contacts 108 to enhance charge collection. FIG. 8 illustrates a side view 112 of the detector layer of FIG. 7.

It may be noted that a plurality of grid rings (not shown) may be nested to form the grid structure around the plurality of anode pixels regions 106. Further, each of the plurality of grid rings may be biased incrementally with respect to one another to ensure that charge is efficiently collected at the pixelated anode contacts 108. In one embodiment, the nested grid rings may be fabricated employing multi-layer lithography.

Referring to FIG. 3, an electrical field may be applied across each of the plurality of detector layers 72 to aid in the transportation of charge from the common cathode 78 to the plurality of anode pixels 76 across the thickness 86 of each of the plurality of detector layers 72. For example, the common cathode contact 78 may be biased at negative 1000 volts. Also, the plurality of pixelated anode contacts 76 may be biased at ground with each anode contact 76 coupled to a respective amplifier channel on the readout ASIC. Turning now to FIG. 7, the grid structure 110 may be biased differently than that of the plurality of pixelated anode contacts 108 to facilitate the steering of electrons for collection by the pixelated anode contacts 108. The grid electrode 110 may be biased at a voltage that is between the bias voltages of the pixelated anode contacts 108 and the common cathode contact 78, thereby ensuring that the charges are collected at the pixelated anode contacts 108.

Figure 9:
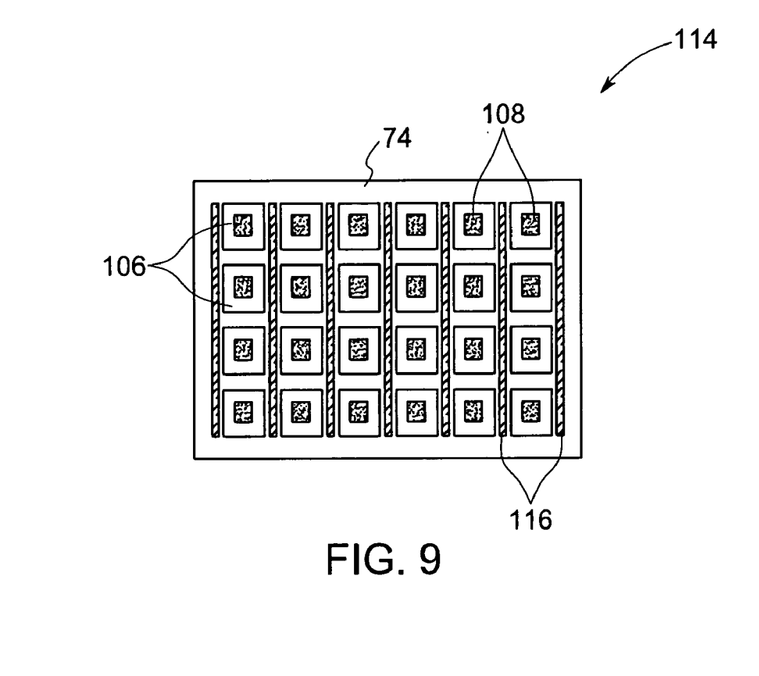
FIG. 9 is a front view of yet another exemplary arrangement of anode contacts on a layer of the CT detector of FIG. 3, in accordance with aspects of the present technique.

FIG. 9 is a front view 114 of yet another exemplary arrangement of the pixelated anode contacts 108 on a detector layer 74 of the CT detector module 68 of FIG. 3, in accordance with aspects of the present technique. In accordance with exemplary aspects of the present technique, it may not be necessary to completely surround the anode pixel regions 106. Accordingly, in this embodiment, the grid structure is patterned in the form of grid fingers 116, where the grid fingers 116 are disposed on either side of the anode pixel regions 106.

Figure 10:
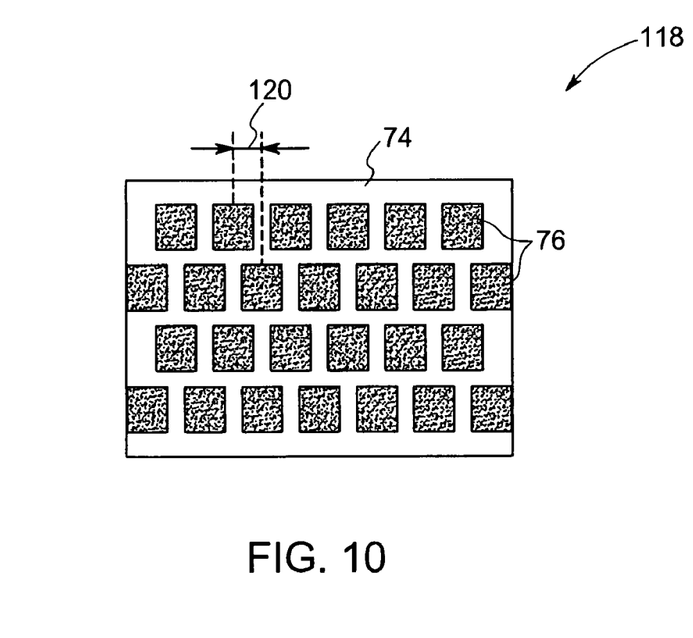
FIG. 10 is a front view of another exemplary arrangement of anode contacts on a layer of the CT detector of FIG. 3, in accordance with aspects of the present technique.

Referring now to FIG. 10, a front view 118 of another exemplary arrangement of pixelated anode contacts 76 on a detector layer 74 of the CT detector module 68 of FIG. 3, in accordance with aspects of the present technique, is illustrated. In this exemplary embodiment, the plurality of pixelated anode contacts 76 may be offset to facilitate obtaining multiple samples of the incident flux profile. This arrangement advantageously facilitates greater spatial resolution to be obtained due to reduced number of aliasing artifacts. In the illustrated embodiment, the pixelated anode contacts 76 are arranged at an offset 120 of ½ pixel.

Figures 11, 12:
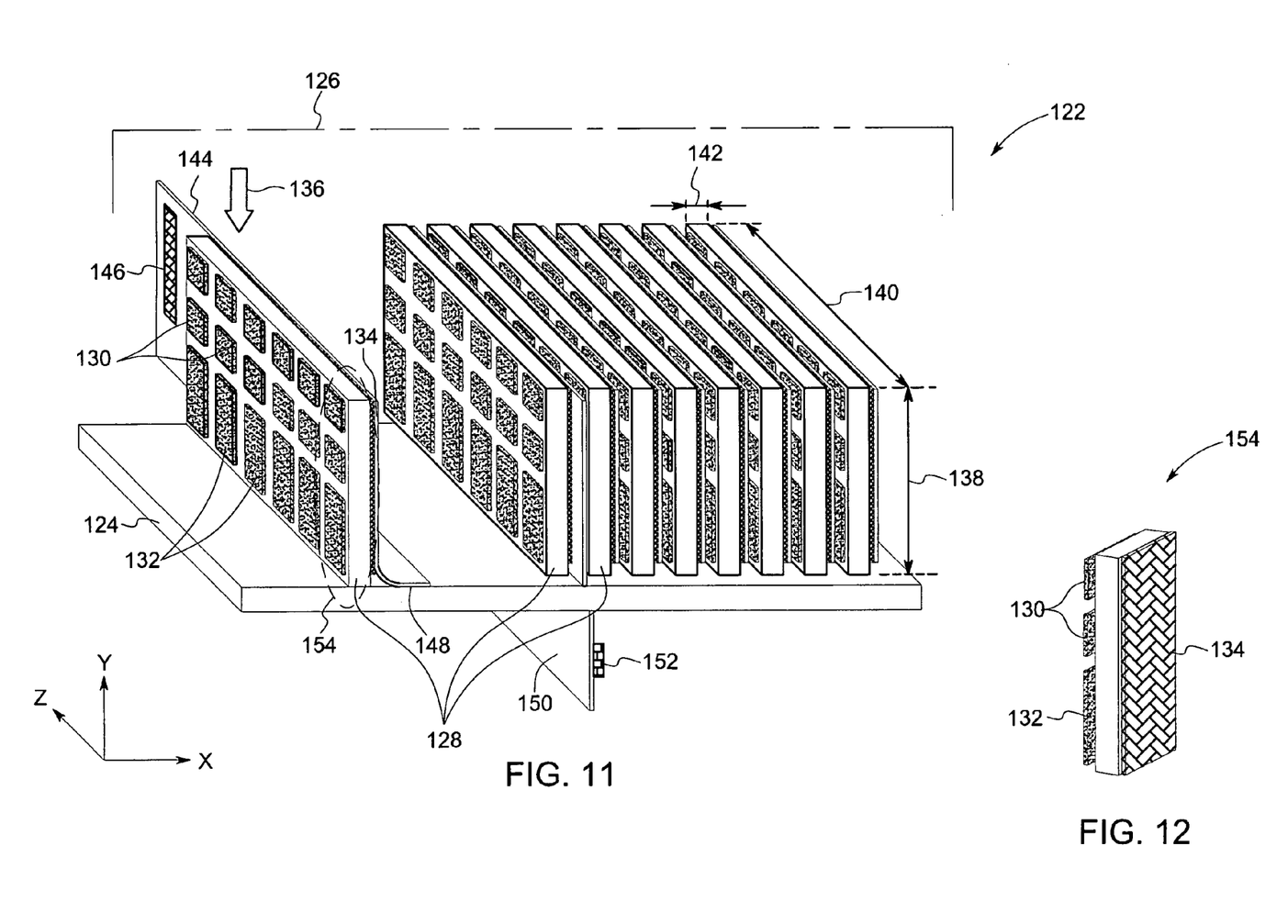
FIG. 11 is a perspective view of another exemplary multi-layer, direct conversion CT detector, in accordance with aspects of the present technique.
FIG. 12 is an enlarged view of one column of an exemplary layer of the CT detector of FIG. 11, in accordance with aspects of the present technique.

Turning now to FIG. 11, a perspective view of another exemplary multi-layer, direct conversion CT detector module 122, in accordance with aspects of the present technique, is illustrated. As previously described with reference to FIG. 3, the CT detector module 122 of FIG. 11 includes a substrate 124 having a topside and a bottom side. Further, as with FIG. 3, a plurality of detector layers 126 may be disposed on the topside of the substrate 124. Each of the plurality of detector layers 126 may include a direct conversion material that may be configured to absorb impinging radiation. Also, each of the plurality of detector layers 126 may have a respective first side and a second side.

Further, as previously described, a plurality of pixelated anode contacts may be arranged in an array on the each of the first sides of the plurality of detector layers 126. In this embodiment, the plurality of anode contacts includes anode contacts of different sizes, where the size of the anode pixels is incrementally increased in the direction of radiation 136. In the present exemplary embodiment, the plurality of anode contacts includes smaller anode contacts 130 and larger anode contacts 132. The plurality of smaller anode contacts 130 may be disposed on each of the plurality of detector layers 126 closer to the source of radiation 136 than the plurality of larger anode contacts 132. In addition, a common cathode contact 134 may be disposed on the second side of each of the plurality of detector layers 126. Also, reference numeral 128 represents individual detector layers within the plurality of detector layers 126.

With continuing reference to FIG. 11, each of the plurality of detector layers 126 may be arranged on the substrate 124 such that each of the plurality of detector layers 126 is oriented substantially parallel to the direction of radiation 136. Hence, the charge is transported laterally across from the common cathode contact 134 to the plurality of pixelated anode contacts 130, 132. In other words, the charge transport direction is substantially orthogonal to the direction of radiation 136. Consequently, the height 138 of the detector layer 128 that may be desirable to effectively stop x-rays may be independent of the charge collection time, charge trapping and charge sharing phenomena. Accordingly, the thickness 142 of the detector layer 128 may be selected to be sufficiently thin in order to achieve a small charge collection time and associated large saturation flux rate limit. Further, polarization may also be reduced in the thin detector layer due to the efficient collection of both electrons and holes.

As will be appreciated, the x-rays are absorbed at different depths in each of the plurality of detector layers 126. Accordingly, in accordance with exemplary aspects of the present technique, the size and multiplicity of the array of pixelated anode pixels 130, 132 may be tailored to optimize the performance of the CT detector module 122. In particular, x-rays are preferentially absorbed at the region where the x-rays impinge on the detector layers 126. As a result, the plurality of anode contacts may be configured to include anode contacts of different sizes, where the size of the pixelated anode contacts is incrementally increased in the direction of radiation 136. Accordingly, in this embodiment, the size of the plurality of anode contacts 130 disposed closer to the site of impinging radiation may be relatively smaller than the size of the plurality of anode contacts 132. For example, the size of the smaller anode contacts 130 may be in a range from about $0.2 \times 0.2$ mm² to about $1.0 \times 1.0$ mm². Further, the size of the plurality of anode contacts 132 disposed further down the direction of radiation 136 may be relatively larger as compared to the plurality of smaller anode contacts 130 and be rectangular in shape in order to maintain the same pitch in lateral direction as the small anode contacts 130. For example, the size of these larger anode contacts 134 may be in a range from about $0.2 \times 0.5$ mm² to about $1.0 \times 3.0$ mm².

With continuing reference to the plurality of detector layers 126, as previously described with reference to FIG. 3, in one embodiment, the height 138 of each of the plurality of detector layers 126 may be in a range from about 2 mm to about 5 mm. Also, the length 140 of the plurality of detector layers 126 may be in a range from about 4 mm to about 32 mm. Furthermore, each of the plurality of detector layers 126 may be configured to be substantially thin. For example, the thickness 142 of each of the plurality layers 126 may be in a range from about 0.2 mm to about 1 mm.

According to aspects of the present technique, the CT detector module 122 may also include an electrical interconnect layer disposed between each of adjacent layers of the plurality of detector layers 126. As will be appreciated, the electrical interconnect layer may be configured to electrically couple the plurality of pixelated anode contacts 130, 132 and common cathode contact 134 disposed on each of the plurality of detector layers 126 to read out electronics to be converted to a digital signal.

Figure 13:
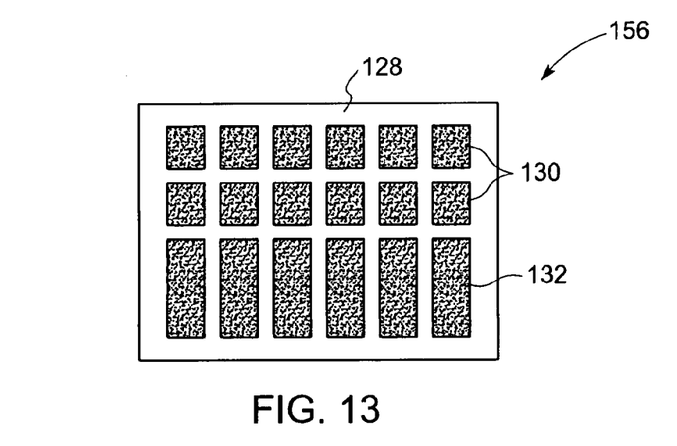
FIG. 13 is a front view of an exemplary arrangement of anode contacts on a layer of the CT detector of FIG. 11, in accordance with aspects of the present technique.

In one embodiment, the CT detector module 122 may include an electrical interconnect layer 144 that extends in the Z-direction and is disposed between each of adjacent layers of the plurality of detector layers 126. This interconnect layer 144 may include a connector 146 that may be configured to facilitate coupling the plurality of pixelated anode contacts 130, 132 and common cathode contact 134 to readout electronics via the electrical interconnect layer 144. The CT detector module 122 may also include an electrical interconnect layer 148 that makes a J-shaped contact with the substrate 124 disposed between each of adjacent layers of the plurality of detector layers 126. In addition, the CT detector module 122 may include an electrical interconnect layer 150 that extends in the negative Y-direction and is disposed between each of adjacent layers of the plurality of detector layers 126. Further, this interconnect layer 150 may include a connector 152 that may be configured to facilitate coupling the plurality of pixelated anode contacts 130, 132 and common cathode contact 134 to readout electronics via the electrical interconnect layer 150. Reference numeral 154 represents one column on one of the detector layers 126. FIG. 12 illustrates an enlarged view of one column 154 of an exemplary layer 126 of the CT detector module 122 of FIG. 11. FIG. 13 illustrates a front view 156 of an exemplary arrangement of the plurality of pixelated anode contacts 130, 132 on an individual detector layer 128 of FIG. 11.

Figure 14:
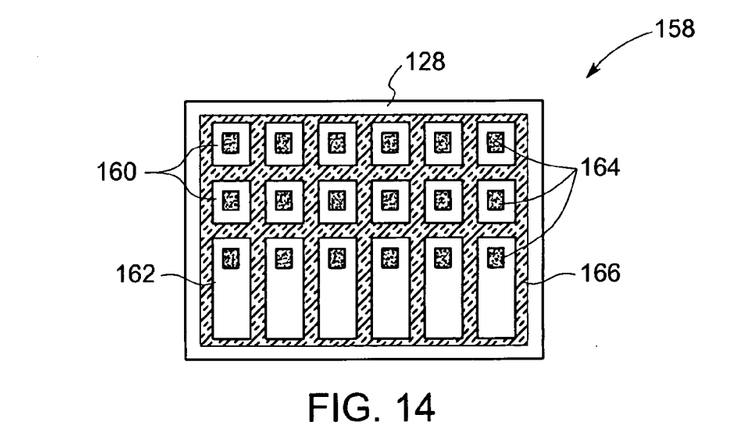
FIG. 14 is a front view of another exemplary arrangement of anode contacts on a layer of the CT detector of FIG. 11, in accordance with aspects of the present technique.

FIG. 14 illustrates a front view 158 of another exemplary arrangement of pixelated anode contacts on the individual detector layer 128 of FIG. 11. Also illustrated are a plurality of smaller anode pixel regions 160 and a plurality of larger anode pixel regions 162, in accordance with aspects of the present technique. In this embodiment, the pitch of each of the anode pixel regions 160 is substantially similar to the pitch of the pixelated anode contacts 130 (see FIG. 11). Also, the pitch of each of the plurality of anode pixel regions 162 is substantially similar to the pitch of the anode pixels 132 (see FIG. 11). However, surface area of pixelated anode contacts represented by reference numeral 164 is substantially lesser than that of the anode pixel regions 160 and 162. In other words, the size of the pixelated anode contacts 164 is substantially smaller than that of the pixelated anode contacts 130 and 132 illustrated in FIG. 11. Consequently, as previously described, the size of the pixelated anode contacts 164 is small enough to achieve good small pixel effect while maintaining large pixel pitch that is comparable or larger than the detector thickness 142 (see FIG. 11).

Using the exemplary arrangement of pixelated anode contacts of different sizes on each of the plurality of detector layers 126, a higher count rate saturation may be achieved. Also, this arrangement allows a smaller pixel size of anode contacts without suffering from any degradation due to charge sharing. Further, the response of the CT detector module 122 may be relatively more stable due to reduced charge trapping phenomena. Additionally, no charge sharing occurs between each of the plurality of detector layers 126. Consequently, the exemplary CT detector module 122 may be configured to measure the incident radiation with more consistent response as function of incident flux rate.

As previously noted, in accordance with exemplary aspects of the present technique, a non-collecting control grid structure 166 surrounds each of the plurality of anode pixel regions 160, 162 is disposed on each detector layer 128 (see FIG. 11). The grid structure 166 may be configured to facilitate collection of electrons at the plurality of pixelated anode contacts 164. The grid electrode 166 may be configured to make the size of each pixelated anode contact small enough for good small pixel effect while maintain large pixel pitch that is comparable or larger than the detector thickness 142 (see FIG. 11). The grid electrode 166 may be negatively biased relative to the pixelated anode contacts 164 to prevent the collection of electrons at the grid 166. Hence, the biased grid 166 helps to focus the electric field and facilitates collection of electrons at the pixelated anode contacts 164, as previously described.

Figure 15:
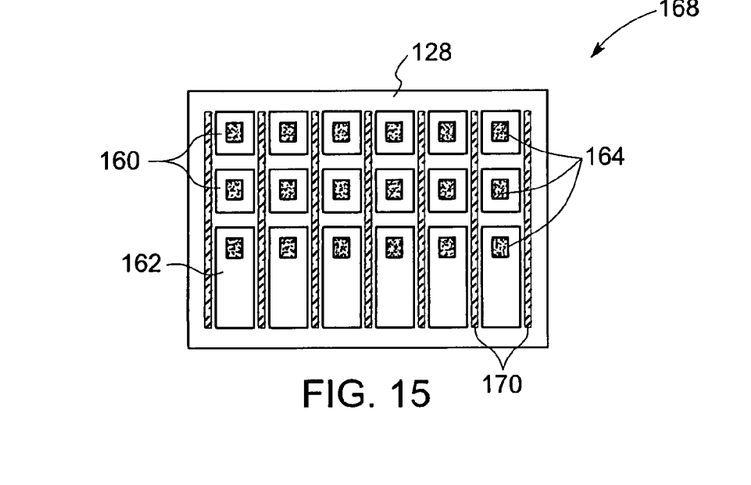
FIG. 15 is a front view of yet another exemplary arrangement of anode contacts on a layer of the CT detector of FIG. 11, in accordance with aspects of the present technique.

FIG. 15 is a front view 168 of yet another exemplary arrangement of anode pixels regions 160, 162 on a detector layer 128 of the CT detector module 122 of FIG. 11, where the grid structure is patterned in the form of grid fingers 170 and disposed on either side of the anode pixel regions.

Figure 16:
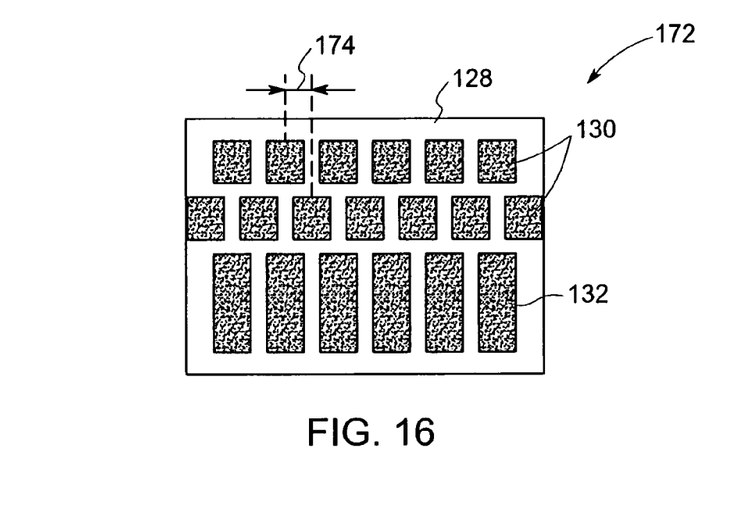
FIG. 16 is a front view of another exemplary arrangement of anode contacts on a layer of the CT detector of FIG. 11, in accordance with aspects of the present technique.

Referring now to FIG. 16, a front view 172 of another exemplary arrangement of pixelated anode contacts 130, 132 on a detector layer 128 of the CT detector module 122 of FIG. 11, in accordance with aspects of the present technique, is illustrated. As previously described with reference to FIG. 10, the plurality of anode pixels 130, 132 may be offset 174 to facilitate obtaining multiple samples of the incident flux profile.

Figure 17:
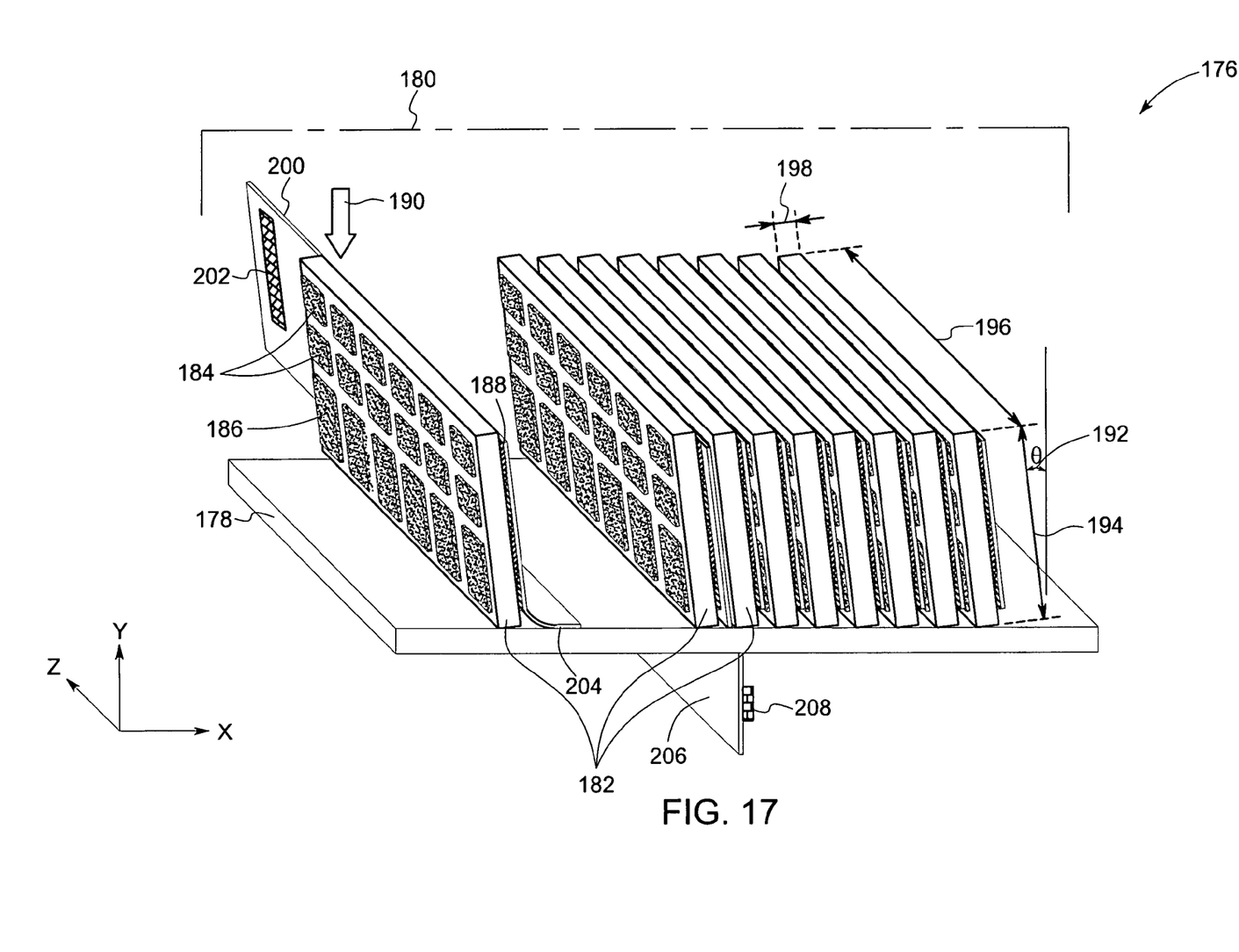
FIG. 17 is a perspective view of yet another exemplary multi-layer, direct conversion CT detector, in accordance with aspects of the present technique.

Referring now to FIG. 17, a perspective view of yet another exemplary multi-layer, direct conversion CT detector module 176, in accordance with aspects of the present technique, is illustrated. As previously described, the CT detector module 176 may include a substrate 178. A plurality of detector layers 180 that may include a direct conversion material 182 may be disposed on the substrate 178. A plurality of pixelated anode contacts 184, 186 of different sizes may be disposed on each of a first side of the plurality of detector layers 180, while a common cathode contact 188 may be disposed on each of a second side of the plurality of detector layers 180. Also, reference numeral 182 represents individual detector layers within the plurality of detector layers 180.

As with FIG. 11, in accordance with exemplary aspects of the present technique, each of the plurality of detector layers 180 is oriented at an angle θ 192 to the direction of radiation 190. In other words, each of the plurality of detector layers 180 is oriented with the respective common cathode 188 receiving the radiation at a small incident angle 192. Further, each of the plurality of detector layers 180 may be configured to function as a line in a two-dimensional sensor array as the projection width of the detector layer 180 along the x-ray trajectory may be substantially equal to the pixel pitch of the array of anode pixels 184, 186. The x-ray flux corresponding to a pixel in the two-dimensional sensor array facilitates illuminating a strip of the detector layer 180 with increased detection area due to the small incident angle 192. Further, the x-ray flux is uniformly shared by the multiple readout pixels within that strip. Consequently, by appropriately choosing the angle of inclination 192 and the size of each detector layer 180, the x-ray flux rate per unit detection area at each detector layer 180 may be advantageously reduced by a predetermined factor. In one embodiment, the predetermined factor may be determined by the incident angle 192, the size of the detector layer 180 and the size of the readout pixels. Subsequently, after each readout, the counts recorded at multiple readout pixels may be combined to obtain the data associated with a pixel in the two-dimensional sensor array.

Figure 18:
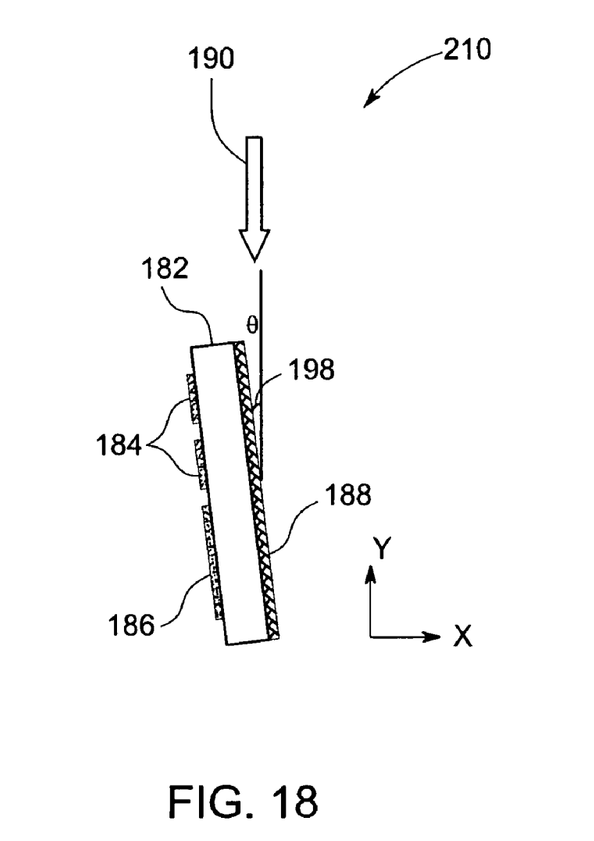
FIG. 18 is a side view of the detector layer of FIG. 17, in accordance with aspects of the present technique.

With continuing reference to FIG. 17, each of the plurality of detector layers 180 has a respective height 194, length 196 and thickness 198. Further, an electrical interconnect layer 200 that extends in the Z-direction may be disposed between each of the plurality of detector layers 180, where the interconnect layer 200 has a connector 202. The CT detector module 176 may also include an electrical interconnect layer 204 that makes a J-shaped contact with the substrate 178. Also, the CT detector module 176 may include an electrical interconnect layer 206 that extends in the negative Y-direction, where the electrical interconnect layer 206 includes a connector 208. FIG. 18 illustrates a side view 210 of a detector layer 182 of FIG. 17.

Figure 19:
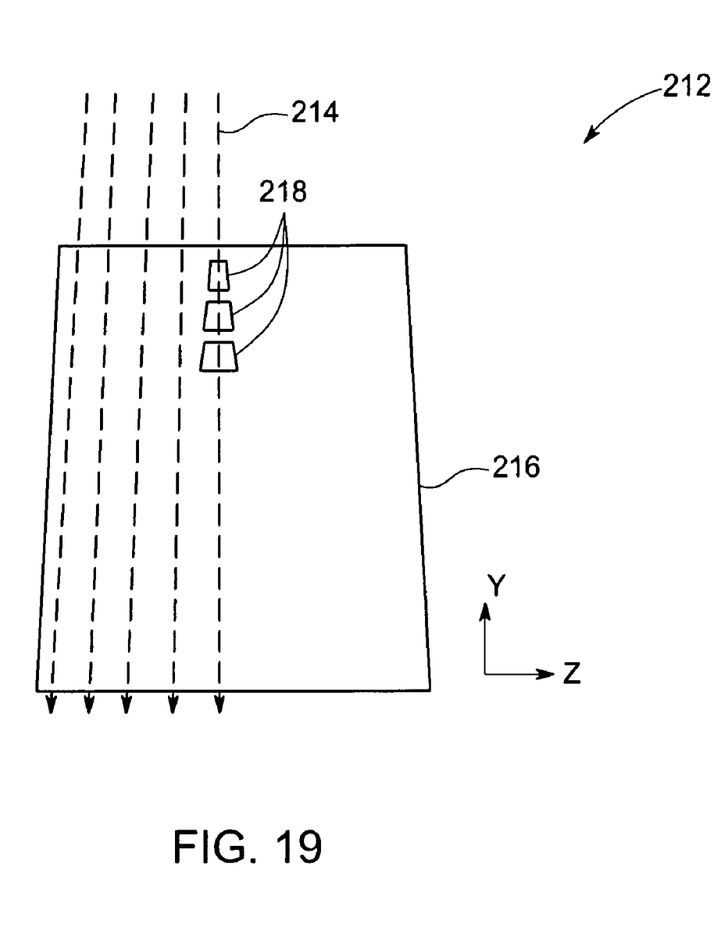
FIG. 19 is a front view of an exemplary arrangement of detector layers of the CT detector of FIG. 17, in accordance with aspects of the present technique.

FIG. 19 illustrates a front view 212 of an exemplary arrangement of a detector layer 182 of the CT detector module 176 of FIG. 17, in accordance with aspects of the present technique. As will be appreciated, the x-ray source 12 (see FIG. 1) may be a point source. Further, in a detector layer 180 having a substantially greater length, the x-ray trajectory 214 may not follow a parallel beam geometry. In certain embodiments, the x-ray trajectory 214 may follow a fan beam geometry. Accordingly, the pixelation of the plurality of anode contacts may be advantageously reconfigured in order to cover the fan beam to collect the energy. In accordance with an exemplary embodiment of the present technique, the shape of the detector layer 216 and the shapes of the plurality of pixelated anode contacts 218 may be adjusted according to the x-ray trajectory.

The various embodiments of the CT detector modules 68, 122, 176 described hereinabove facilitate rapid, consistent and efficient electric charge collection thereby resulting in increased x-ray photon flux rate capacity before saturation. Thus, the CT detector modules 68, 122 176 exhibit enhanced energy resolution and shorter detector dead time. Further, the use of the exemplary steering grid structure facilitates use of substantially smaller pixelated anode contacts thereby resulting in enhanced small pixel effect. In addition, no charge sharing occurs between the detector layers. Hence, the CT detector modules 68, 122, 176 may exhibit higher resolution due to smaller pixel sizes without charge sharing penalty and improved sampling with offset pixelated anode contacts. Also, by properly choosing the x-ray incident angle and the size of the detector layers, uniform sharing of x-ray flux among multiple readout pixels may be achieved, while maintaining relatively large physical pixel size at each detector layer. Maintaining large physical pixel size at each detector layer advantageously aids in controlling charge sharing and spillover.

Additionally, the direct conversion material may be deposited on the electrical interconnect layer or screen printed due to reduced thickness. A high volume lamination process where the direct conversion material is applied to the interconnect layer in large area, spooled webs may be employed. These webs may be subsequently unrolled and diced into sections of dimension appropriate to the construction of the detector. Further, the deposition, dicing and lamination of detector sections may be automated for low cost manufacture.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A computed tomography detector module comprising:
   a substrate having a topside and a bottom side;
   a plurality of detector layers disposed on the topside of the substrate in a direction that is substantially orthogonal to the substrate, wherein each of the plurality of detector layers comprises a direct conversion material configured to absorb radiation, and wherein each of the plurality of detector layers comprises a first side and a second side;
   a plurality of pixelated anode contacts disposed on the first side of each of the plurality of detector layers;
   a common cathode contact disposed on the second side of each of the plurality of detector layers; and
   an electrical interconnect layer that extends in a Z-direction disposed between each of adjacent layers of the plurality of detector layers, wherein the electrical interconnect layer comprises a connector configured to couple the plurality of pixelated anode contacts disposed on each of the plurality of detector layers to read out electronics.

2. The detector module of claim 1, wherein the electrical interconnect layer comprises a flexible circuit, and wherein the flexible circuit comprises copper traces formed on a polyimide film.

3. The detector module of claim 1, wherein the second side of each of the plurality of detector layers is arranged to receive the radiation before each respective first side of the plurality of detector layers.

4. The detector module of claim 1, further comprising a non-collecting, control grid structure disposed between each of the plurality of pixelated anode contacts, wherein the control grid structure is configured to facilitate collection of electrons at the plurality of pixelated anode contacts.

5. The detector module of claim 1, wherein each of the plurality of detector layers is oriented substantially parallel to the direction of radiation.

6. The detector module of claim 1, wherein each of the plurality of detector layers is oriented at an angle to the direction of radiation, and wherein the second side of each of the plurality of detector layers is arranged to receive the radiation before each respective first side of the plurality of detector layers.

7. The detector module of claim 1, wherein each of the plurality of pixelated anode contacts is substantially the same size.

8. The detector module of claim 1, wherein the plurality of pixelated anode contacts comprises anode contacts of different sizes, and wherein the size of the pixelated anode contacts is incrementally increased in the direction of radiation.

9. A computed tomography detector module comprising:
   a substrate having a topside and a bottom side;
   a plurality of detector layers disposed on the topside of the substrate in a direction that is substantially orthogonal to the substrate, wherein each of the plurality of detector layers comprises a direct conversion material configured to absorb radiation, and wherein each of the plurality of detector layers comprises a first side and a second side;
   a plurality of pixelated anode contacts disposed on the first side of each of the plurality of detector layers, wherein the plurality of pixelated anode contacts comprises anode contacts of substantially equal size;
   a common cathode contact disposed on the second side of each of the plurality of detector layers;
   a non-collecting, control grid structure disposed between each of the plurality of pixelated anode contacts, wherein the control grid structure is configured to facilitate collection of electrons at the plurality of pixelated anode contacts; and
   a J-shaped electrical interconnect layer disposed between each of adjacent layers of the plurality of detector layers and configured to couple the plurality of pixelated anode contacts disposed on each of the plurality of detector layers to read out electronics.

10. The detector module of claim 9, wherein the control grid structure is negatively biased relative to the plurality of pixelated anode contacts.

11. The detector module of claim 9, wherein each of the plurality detector layers is oriented substantially parallel to the direction of radiation.

12. A computed tomography detector module comprising:
a substrate having a topside and a bottom side;
a plurality of detector layers disposed on the topside of the substrate and configured to absorb radiation, wherein each of the plurality of detector layers comprises a direct conversion material, and wherein each of the plurality of detector layers includes a first side and a second side;
a plurality of pixelated anode contacts disposed on the first side of each of the plurality of detector layers, wherein the plurality of pixelated anode contacts comprises anode contacts of different sizes, and wherein the size of the pixelated anode contacts is incrementally increased in the direction of radiation;
a common cathode contact disposed on the second side of each of the plurality of detector layers; and
an electrical interconnect layer that extends in a Y-direction disposed between each of adjacent layers of the plurality of detector layers, wherein the electrical interconnect layer comprises a connector configured to couple the plurality of pixelated anode contacts disposed on each of the plurality of detector layers to read out electronics.

13. The detector module of claim 12, wherein each of the plurality of detector layers is oriented substantially parallel to the direction of radiation.

14. The detector module of claim 12, wherein a non-collecting, control grid structure is disposed between each of the plurality of pixelated anode contacts, wherein the control grid structure is configured to facilitate collection of electrons at the plurality of pixelated anode contacts.

15. A computed tomography detector module comprising:
a substrate having a topside and a bottom side;
a plurality of detector layers disposed on the top side of the substrate and configured to absorb radiation, wherein each of the plurality of detector layers is oriented at an angle to the direction of radiation, and wherein each of the plurality of detector layers comprises a direct conversion material, and wherein each of the plurality of detector layers includes a first side and a second side;
a plurality of pixelated anode contacts disposed on the first side of each of the plurality of detector layers;
a common cathode contact disposed on the second side of each of the plurality of detector layers; and
an electrical interconnect layer disposed between each of adjacent layers of the plurality of detector layers, wherein the electrical interconnect layer comprises a connector configured to couple the plurality of pixelated anode contacts disposed on each of the plurality of detector layers to read out electronics, and wherein the electrical interconnect layer comprises a J-shaped electrical interconnect layer, an interconnect layer that extends in a Z-direction, or an interconnect layer that extends in a Y-direction.

16. The detector module of claim 15, wherein the angle is selected to reduce radiation flux rate per unit detection area.

17. The detector module of claim 15, wherein a non-collecting, control grid structure is disposed between each of the plurality of pixelated anode contacts, wherein the control grid structure is configured to facilitate collection of electrons at the plurality of pixelated anode contacts.

* * * * *